(12) United States Patent
Lee et al.

(10) Patent No.: US 9,116,070 B2
(45) Date of Patent: Aug. 25, 2015

(54) HYDRAULIC TEST DEVICE FOR HEAD LOSS OF STRAINER AND TEST METHOD THEREOF

(75) Inventors: Byung-Chul Lee, Seoul (KR);
Chan-Kook Moon, Daejeon-si (KR);
Hyeong-Taek Kim, Daejeon-si (KR);
Sang-Won Lee, Daejeon-si (KR);
Yu-Jung Choi, Daejeon-si (KR);
Tae-Hyub Hong, Daejeon-si (KR)

(73) Assignees: FNC TECHNOLOGY CO., LTD., Seoul (KR); KOREA HYDRO & NUCLEAR POWER CO., LTD., Gyeongsangbuk-Do (KR)

( * ) Notice: Subject to any disclaimer, the term of this patent is extended or adjusted under 35 U.S.C. 154(b) by 442 days.

(21) Appl. No.: 13/495,351

(22) Filed: Jun. 13, 2012

(65) Prior Publication Data

US 2013/0333461 A1   Dec. 19, 2013

(51) Int. Cl.
*G01M 13/00* (2006.01)
(52) U.S. Cl.
CPC ..................................... *G01M 13/00* (2013.01)
(58) Field of Classification Search
CPC ............... G01F 1/34; G01F 1/40; G01F 1/36; G01F 1/42; G01F 1/46; G01F 1/684; G01F 1/44; G01F 1/88; G01F 1/68; G01M 13/00; G01M 3/02; G01M 3/26; G01M 3/28; G01M 3/2807; G01M 3/2815
USPC ............... 73/12.07, 861.42, 37, 204.11, 1.35, 73/168, 38, 756
See application file for complete search history.

(56) References Cited

U.S. PATENT DOCUMENTS

| | | | | |
|---|---|---|---|---|
| 4,531,889 | A | * | 7/1985 | Grondahl ..................... 416/96 R |
| 2008/0223779 | A1 | * | 9/2008 | Kaufman et al. .......... 210/416.1 |
| 2010/0154513 | A1 | * | 6/2010 | Lin et al. ........................... 73/38 |
| 2010/0205921 | A1 | * | 8/2010 | Okazaki et al. ................. 55/523 |
| 2011/0232368 | A1 | * | 9/2011 | Al-Dhafeeri et al. ............ 73/37 |
| 2013/0208847 | A1 | * | 8/2013 | Prather et al. ................. 376/309 |

* cited by examiner

*Primary Examiner* — Hezron E Williams
*Assistant Examiner* — Marrit Eyassu
(74) *Attorney, Agent, or Firm* — Harness, Dickey & Pierce, P.L.C.

(57) ABSTRACT

Provided is a hydraulic test device for head loss of a strainer and a test method thereof, wherein the hydraulic test device comprises a circulation pipe; an inflow container; a container; a debris interceptor; sensors; a circulation pump; a flow meter; a circulation heating heater; and a data acquisition part which stores data sensed by each sensor, flow rate data.

6 Claims, 4 Drawing Sheets

HYDRAULIC TEST DEVICE FOR HEAD LOSS OF STRAINER AND TEST METHOD THEREOF

FIELD

The present invention relates to a hydraulic test device for head loss of a strainer and a test method thereof. Particularly the present invention relates to a hydraulic test device for head loss of a strainer, which can comprehensively estimate hydraulic elements that exerts an influence on the head loss of the strainer when performing a performance test for the strainer of a containment recirculation sump in an emergency core cooling system of a nuclear power plant, and a test method thereof.

BACKGROUND

Generally, in a strainer of ECCS recirculation sump in an emergency core cooling system of a nuclear power plant, there is a problem that cooling water circulation is not facilitated due to head loss, as emergency operation time is increased. Therefore, it is necessary to estimate whether the strainer can be used during the recirculation mode. In the prior art, the ALDEN company, CCI company, ALION company, VUEZ company and the like built an individual head loss test apparatus and a hydraulic test apparatus and measured the performance of the strainer.

The individual head loss test apparatus is to perform a small-scale test for the strainer, i.e., to test the filtering performance of a test piece of the strainer in restricted surroundings.

The hydraulic performance test apparatus is to simulate the hydraulic characteristics around the strainer, and this test is also performed in restricted surroundings.

However, since it is not possible to estimate various on-the-spot factors which have an influence on the strainer performance, except some factors, there is a problem that the reliability of estimation is lowered.

The on-the-spot factors are various, such as a kind and component ratio of debris, a flow rate, temperature and pressure of water, a flow passage around the strainer and the like. The conventional apparatuses can estimate only some of the factors, and particularly a debris interceptor which is disposed at a flow passage directed to the sump; having the strainer directly reduces the debris, such that the head loss of the strainer is reduced. The debris interceptor is also one of the factors which has an influence to the head loss of the strainer, and thus it is necessary to consider a complicated correlation between the debris interceptor and other factors. However, the complicated correlation has not been estimated in the prior art.

SUMMARY

An embodiment of the present invention is directed to providing a hydraulic test device for head loss of a strainer and a test method thereof, which can estimate an influence due to the various factors and the complicated correlation there between.

Another embodiment of the present invention is directed to providing a hydraulic test device for head loss of a strainer and a test method thereof, which can estimate an influence due to an temperature effect of working fluid, a debris interceptor effect and a shape of the sump in which the strainer is provided.

To achieve the object of the present invention, the present invention provides a hydraulic test device for head loss of a strainer including a circulation pipe through which working fluid is circulated; an inflow container which temporarily stores the working fluid supplied through the circulation pipe; a container which receives and stores the working fluid through a straighter from the inflow container; a debris interceptor which is transversely disposed in the container so as to primarily filter debris injected through an injection part; sensors which sense a change in temperature and pressure of the working fluid in the container; a circulation pump which is disposed at one of branch pipes of the circulation pipe so as to circulate the working fluid; a flow meter which is disposed at the circulation pipe so as to measure a flow rate of the working fluid; a circulation heating heater which is disposed at the circulation pipe so as to heat the working fluid; and a data acquisition part which stores data sensed by each sensor, flow rate data measured by the flow meter and temperature data obtained by detecting heating temperature of the circulation heating heater.

Further, the present invention provides a test method of head loss of a strainer, which is performed by measuring a pressure difference between both ends of the strainer while working fluid is circulated, including circulating the working fluid after controlling the working fluid to be corresponding to on-the-spot pressure and temperature; injecting chemical and non-chemical debris, which are actually generated on the spot, into the circulated working fluid; and primarily filtering the injected debris before the debris are arrived at the strainer.

DRAWINGS

| Detailed Description of Main Elements | |
| --- | --- |
| 110: inflow container | 111: straighter |
| 112: circulation pipe | 113: injection part |
| 120: container | 121: debris interceptor |
| 122~125: sensor | 126: strainer |
| 130: circulation pump | 140: flow meter |
| 150: circulation heating heater | 121a: vertical plate |
| 160: data acquisition part | 121b: horizontal plate |
| | V1-V4: valve |

DETAILED DESCRIPTION

Hereinafter, the embodiments of the present invention will be described in detail with reference to accompanying drawings.

Figure 1:
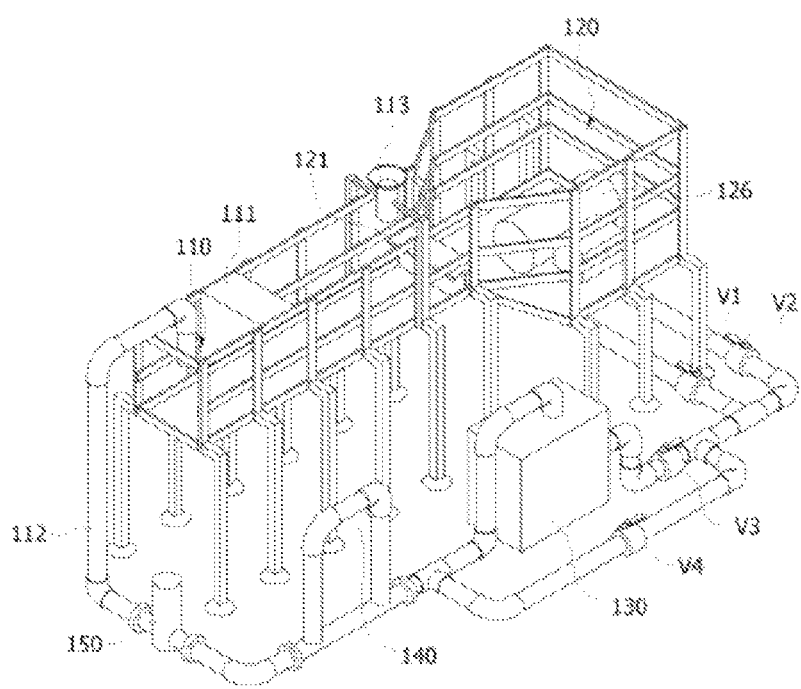
FIG. 1 is a view showing the configuration of a hydraulic test device for head loss of a strainer according to a preferable embodiment of the present invention.
Figure 2:
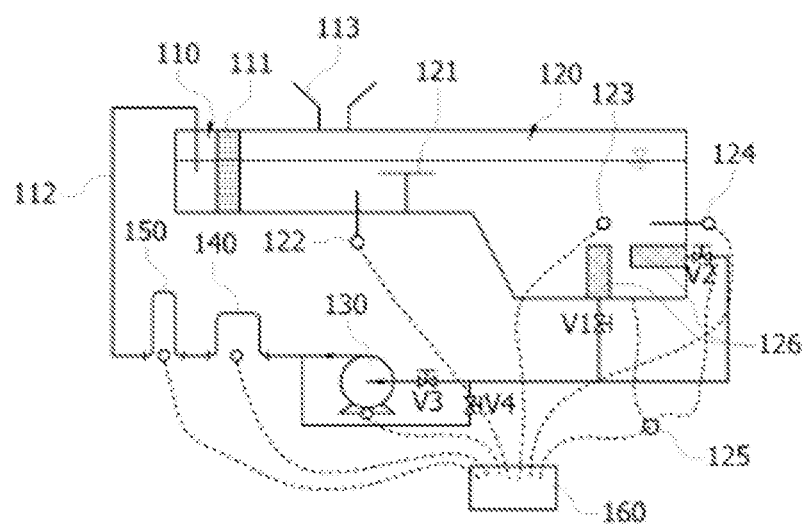
FIG. 2 is a schematic block diagram of the hydraulic test device shown in FIG. 1.

FIG. 1 is a view showing the configuration of a hydraulic test device for head loss of a strainer according to a preferable embodiment of the present invention, and FIG. 2 is a schematic block diagram of the hydraulic test device shown in FIG. 1.

Referring to FIGS. 1 and 2, a hydraulic test device for head loss of a strainer according to a preferable embodiment of the present invention includes an inflow container 110 in which working fluid circulated through a circulation pipe 112 is introduced, a container 120 which receives and stores the working fluid through a straighter 111 from the inflow container 110 and detects temperature and pressure of the working fluid using each sensor 122, 123, 124, 125 and also discharges the working fluid through a strainer 126 and the circulation pipe 112, a debris interceptor 121 which is formed at the container 120 so as to firstly block debris before the strainer 126, an injection part 113 which is formed at a front side of the debris interceptor 121 so as to inject the debris, a flow meter 140 which measures a flow rate of the working fluid flowing through the circulation pipe 112 by pressure of a circulation pump 130, a circulation heating heater 150 which heats the working fluid flowing through the circulation pipe 112, and a data acquisition part 160 which stores data sensed by each sensor 122, 123, 124, 125, flow rate data measured by the flow meter 140 and temperature data obtained by detecting heating temperature of the circulation heating heater 150.

Hereinafter, the configuration and operation of the hydraulic test device for head loss of the strainer according to the preferable embodiment of the present invention will be described fully.

First of all, the inflow container 110 is integrally formed with the container 120 and functions to temporarily store the working fluid circulated through the circulation pipe 112 and also to uniformly supply the working fluid to the container 120. Preferably, the container 120 is formed of a transparent material in order to perform optical sensing.

Figure 3:
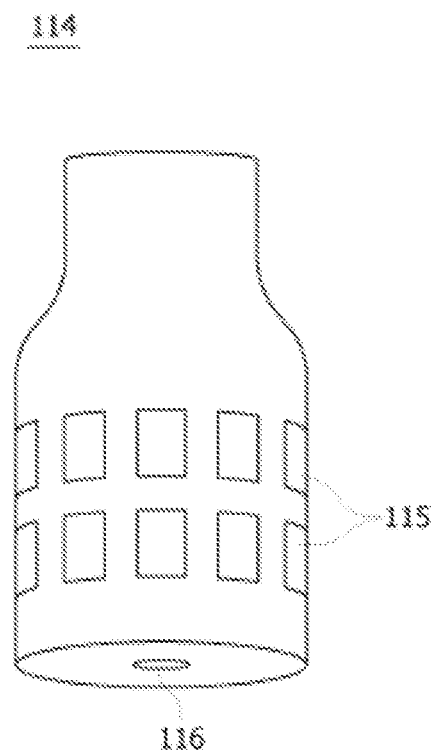
FIG. 3 is a view showing the configuration of a relief nozzle according to an embodiment of the present invention.

FIG. 3 shows the configuration of a relief nozzle 114 that is a distal end of the circulation pipe 112 inserted into the inflow container 110, wherein a plurality of side holes 115 are formed at a side surface the relief nozzle 114 and a lower hole 116 is formed at a lower surface thereof so that the working fluid is supplied in various directions, and the supplied fluid is flowed to the container 120 by the straighter 111.

The straighter 111 is disposed between the inflow container 110 and the container 120. The working fluid supplied to the inflow container 110 is flowed toward the container 120. Herein, liquidness of the working fluid is minimized so that the working fluid can be uniformly supplied to the whole surfaces of the container 120.

The debris which may exert an influence on the head loss of the strainer 126 are injected through the injection part 113 into the working fluid which is supplied from the inflow container 110 to the container 120 through the straighter 111. The injection part 113 is located between the straighter 111 and a debris interceptor 121 to be described later. The injection part 113 may be movably formed in order to check an influence according to injection positions of the debris.

The debris includes chemical and non-chemical materials. Preferably, components and component ratios of the chemical and non-chemical debris are obtained through an experiment, and then the debris combined according to the results of the experiment is injected.

The working fluid containing the debris is flowed to other side of the container 120. Herein, while the working fluid passes the debris interceptor 121 which is formed on a center portion of a bottom surface of the container 120 so as to have a predetermined height, a part of the debris are filtered.

The height of the debris interceptor 121 formed at the container 120 is formed so that the debris interceptor 121 is completely submerged under the working fluid. Therefore, since the debris having a higher density than the working fluid is moved near to a bottom of the container 120, a part of the debris are filtered.

The debris interceptor 121 can be removably disposed at the bottom surface of the container 120, and thus the influence of the debris interceptor 121, which is exerted on the head loss of the strainer 126, can be estimated by installing or not installing the debris interceptor 121.

Figure 4:
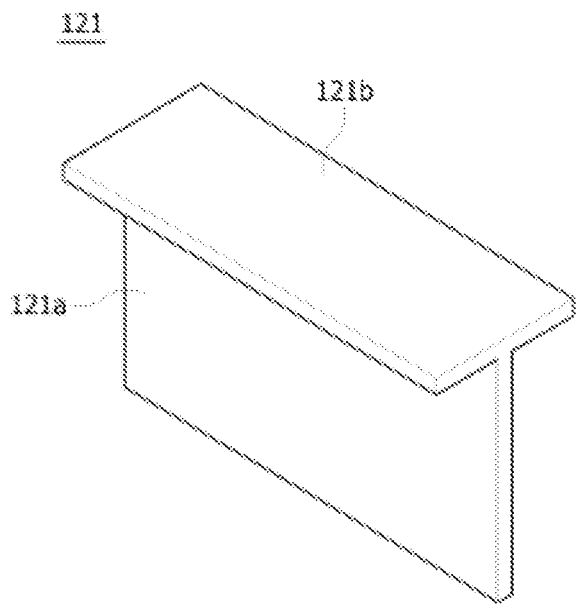
FIG. 4 is a view showing the configuration of a debris interceptor according to an embodiment of the present invention.

FIG. 4 is a view showing the configuration of the debris interceptor 121 according to a preferable embodiment of the present invention.

Referring to FIG. 4, the debris interceptor 121 includes a vertical plate 121a which partially blocks a bottom side of the container 120, and a horizontal plate 121b which is protruded at an upper portion of the vertical plate 121a to be parallel with the bottom surface of the container 120.

Preferably, the horizontal plate 121b is at least protruded to a front end side, i.e., toward the inflow container 110 so that the debris filtered by the debris interceptor 121 is prevented from passing to a rear end side.

The bottom surface of the container 120 has different heights at a rear side of the debris interceptor 121, and a gently inclined surface is formed between the different heights.

The container 120 has a wide width at a portion of the bottom surface having a low height. Such configuration is designed so as to be the same as that of an actual container having the strainer 126. However, the configuration may be changed depending on the actual environment in which the strainer 126 is disposed.

In other words, the configuration of the container 120 is the same as a shape of a containment recirculation sump in an emergency core cooling system of a nuclear power plant. Therefore, it is possible to estimate an influence of the strainer 126, which is exerted on the head loss, by using a shape of the recirculation sump.

The plurality of sensors 122, 123, 124 and 125 are provided at the container 120 so as to measure pressure and temperature at each position and to estimate a temperature difference and a pressure difference. Particularly, the sensor 125 senses the pressure difference between a rear end of the strainer 126 and a front end thereof, and thus it is possible to directly measure a degree of the head loss.

The strainer 126 may be disposed at one of side and bottom surfaces of the container 120, and a valve V1, V2 is provided so as to choose one of the strainers 126 disposed at each side surface and the bottom surface of the container 120, thereby selectively estimating the strainer 126.

The working fluid passing through the strainer 126 is circulated through the circulation pipe 112. Herein, circulation pressure for circulating the working fluid is generated by a circulation pump 130, a height of the container 120 or a convection current due to a temperature difference occurred by the circulation heating heater 150 to be described later.

That is, the circulation pump 130 may be located at one of two branch pipes branched from the circulation pipe 112. A valve V3, V4 is disposed at each branch pipe so as to selectively use the circulation pump 130 or the convection current.

Herein, a flow rate of the working fluid circulated through the circulation pipe 112 may be different according to the circulation method. In case of the circulation pump 130, the working fluid is circulated in higher speed, and thus it is possible to estimate the head loss of the strainer 126.

The flow rate of the working fluid passing through the circulation pipe 112 by the circulation pump 130 is measured by the flow meter 140. The working fluid is heated by the circulation heating heater 150 provided at a rear side of the flow meter 140 and then introduced into the inflow container 110.

The circulation heating heater 150 functions to constantly keep the temperature of the working fluid, while the estimation is carried out in a PID (Proportional Integral Derivative) control method, and thus it is possible to estimate the head loss of the strainer 126 according to the temperature of the working fluid. This allows the working fluid to be kept in the temperature corresponding to the actual environments in the containment recirculation sump in which the working fluid is used as cooling water of the emergency core cooling system, thereby improving the reliability of estimation results.

The circulation heating heater 150 can be operated by controlling of the data acquisition part 160 in which the measured temperature of the working fluid is stored. The data acquisition part 160 functions to store the results sensed by the above-mentioned sensors 122, 123, 124 and 125 and also to control the circulation pump 130.

The circulation pump 130 may be controlled so that its rpm is increased stage by stage as the pressure difference detected by the sensor 125 becomes increased.

This is to constantly keep the flow rate of the working fluid. Since the present invention can constantly keep the temperature, pressure and flow rate of the working fluid, it is possible to estimate the head loss of the strainer 126 according to the individual factors such as temperature, pressure and flow rate and also to estimate a complex influence of the individual factors such as temperature, pressure and flow rate.

According to the hydraulic test device for head loss of the strainer and the test method thereof, the means for controlling the temperature of the working fluid is provided in order to estimate the head loss of the strainer according to the temperature of the working fluid, and the debris interceptor is provided in order to the head loss of the strainer according to the debris interceptor, and the same or similar environments to the shape of the sump in which the strainer is disposed are provided in order to estimate the head loss of the strainer according to the shape of the sump. Thus, it is possible to estimate the various factors and the complicated influence of the various factors, thereby increasing the reliability of the estimated results.

While the present invention has been described with respect to the specific embodiments, it will be apparent to those skilled in the art that various changes and modifications may be made without departing from the spirit and scope of the invention as defined in the following claims.

What is claimed is:

1. A method for testing head loss of a strainer, which comprises use of a hydraulic test device to measure a pressure difference between both ends of the strainer while working fluid is circulated, comprising:

circulating the working fluid after controlling the working fluid to be corresponding to on-the-spot pressure and temperature;

injecting chemical and non-chemical debris, which are generated on the spot, into the circulated working fluid; and primarily filtering the injected debris before the debris are arrived at the strainer, and wherein the hydraulic test device comprises:

a circulation pipe through which working fluid is circulated;

an inflow container which temporarily stores the working fluid supplied through the circulation pipe;

a container which receives and stores the working fluid through a straighter from the inflow container;

a debris interceptor which is transversely disposed in the container so as to primarily filter debris injected through an injection part;

sensors which sense a change in temperature and pressure of the working fluid in the container;

a circulation pump which is disposed at one of branch pipes of the circulation pipe so as to circulate the working fluid;

a flow meter which is disposed at the circulation pipe so as to measure a flow rate of the working fluid;

a circulation heating heater which is disposed at the circulation pipe so as to heat the working fluid; and a data acquisition part which stores data sensed by each sensor, flow rate data measured by the flow meter and temperature data obtained by detecting heating temperature of the circulation heating heater.

2. The method of claim 1, further comprising varying a flow rate of the working fluid according to a degree of the head loss of the strainer.

3. The method of claim 1, wherein the working fluid is circulated by a circulation pump or a convection current generated by heating the working fluid.

4. The method of claim 1, wherein a bottom surface of the container which is located around the strainer is lower than other bottom surface thereof which is adjacent to the inflow container, and a gently inclined surface is formed at a boundary portion of the bottom surface.

5. The method of claim 1, wherein the debris interceptor includes a vertical plate which is formed to have a desired height from the bottom surface of the container, and a horizontal plate which is horizontally protruded at an upper portion of the vertical plate so as to prevent the primarily filtered debris from being introduced into a rear end of the container.

6. The method of claim 1, wherein the data acquisition part controls the circulation pump so that an rpm of the circulation pump is varied stage by stage according to a degree of the head loss of the strainer.

* * * * *